(12) United States Patent
Weng et al.

(10) Patent No.: US 8,368,588 B2
(45) Date of Patent: Feb. 5, 2013

(54) METHOD AND APPARATUS FOR UPDATING TRANSFORMATION INFORMATION PARAMETERS USED IN GLOBAL NAVIGATION SATELLITE SYSTEM

(75) Inventors: Chin-Tang Weng, Kaohsiung (TW); Liang-Chi Huang, Yunlin County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 209 days.

(21) Appl. No.: 12/915,006

(22) Filed: Oct. 29, 2010

(65) Prior Publication Data

US 2011/0043404 A1 Feb. 24, 2011

Related U.S. Application Data

(63) Continuation-in-part of application No. 12/843,729, filed on Jul. 26, 2010, now Pat. No. 8,009,093, which is a continuation of application No. 12/103,387, filed on Apr. 15, 2008, now Pat. No. 7,786,929.

(60) Provisional application No. 61/038,585, filed on Mar. 25, 2008, provisional application No. 60/990,229, filed on Nov. 26, 2007.

(51) Int. Cl.
  *G01S 19/42* (2010.01)
  *G01S 19/27* (2010.01)
(52) U.S. Cl. ............... 342/357.25; 342/357.66
(58) Field of Classification Search ............ 342/357.23, 342/357.25, 357.62, 357.66; 701/468, 469
See application file for complete search history.

(56) References Cited

U.S. PATENT DOCUMENTS

| 5,909,381 | A | 6/1999 | Shome |
| 6,138,074 | A | 10/2000 | Gower |
| 6,266,584 | B1 * | 7/2001 | Hur-Diaz et al. ............... 701/13 |
| 6,411,892 | B1 | 6/2002 | van Diggelen |
| 6,542,820 | B2 | 4/2003 | LaMance |
| 6,560,534 | B2 | 5/2003 | Abraham |
| 6,587,789 | B2 | 7/2003 | van Diggelen |
| 6,703,972 | B2 | 3/2004 | van Diggelen |
| 6,704,651 | B2 | 3/2004 | van Diggelen |
| 6,813,560 | B2 | 11/2004 | van Diggelen |
| 6,845,124 | B2 | 1/2005 | Mattos |
| 6,922,632 | B2 * | 7/2005 | Foxlin ......................... 701/517 |
| 6,992,617 | B2 | 1/2006 | Diggelen |
| 7,403,154 | B2 | 7/2008 | Garin |
| 7,403,558 | B2 | 7/2008 | Mattos |

(Continued)

FOREIGN PATENT DOCUMENTS

| CN | 101446628 A | 6/2009 |
| EP | 1783509 | 5/2007 |

(Continued)

OTHER PUBLICATIONS

Jager, R.and S. Kalber, "The New RTCM 3.1 Transformation Messages-Declaration, Generation from Reference Transformations and Implementation as a Server-Client-Concept for GNSS Services", 3rd International Conference and 3rd Trade Fair of Geodesy, Cartography, Navigation and Geoinformatics. Prague, Feb. 27-28, 2008. http://www.galileo-bw.de/leseobjekte.pdf?id=259, pp. 1-22.

(Continued)

*Primary Examiner* — Dao Phan
(74) *Attorney, Agent, or Firm* — Winston Hsu; Scott Margo

(57) ABSTRACT

A method for updating a set of transformation information parameters used in a global navigation satellite system includes: obtaining at least one satellite navigation information for a satellite; and updating the set of transformation information parameters according to the obtained satellite navigation information. The method can extend the life time of the set of transformation information parameters, and used to generate better predictions of the satellite trajectory therefore the TTFF can be reduced while the positioning accuracy can also be improved.

16 Claims, 6 Drawing Sheets

U.S. PATENT DOCUMENTS

| | | |
|---|---|---|
| 7,406,113 B2 | 7/2008 | Mattos |
| 7,436,357 B2 | 10/2008 | Wang |
| 7,548,200 B2 | 6/2009 | Garin |
| 7,564,406 B2 | 7/2009 | Han |
| 7,595,752 B2 | 9/2009 | van Diggelen |
| 7,626,534 B1 * | 12/2009 | Boka et al. ................ 342/90 |
| 7,786,929 B2 | 8/2010 | Weng |
| 8,009,093 B2 | 8/2011 | Weng |
| 8,120,530 B2 | 2/2012 | Weng |
| 2002/0120400 A1 * | 8/2002 | Lin ............................. 701/214 |
| 2002/0190898 A1 | 12/2002 | Abraham |
| 2006/0055598 A1 | 3/2006 | Garin |
| 2007/0200752 A1 | 8/2007 | van Diggelen |
| 2007/0247354 A1 | 10/2007 | Garin |
| 2007/0260399 A1 | 11/2007 | Abraham |
| 2007/0299609 A1 | 12/2007 | Garin |
| 2008/0186228 A1 | 8/2008 | Garin |
| 2008/0270026 A1 | 10/2008 | Han |
| 2009/0009389 A1 | 1/2009 | Mattos |
| 2009/0219206 A1 | 9/2009 | Garin |
| 2009/0231192 A1 | 9/2009 | van Diggelen |
| 2009/0315773 A1 | 12/2009 | Tomita |
| 2010/0117897 A1 * | 5/2010 | Riley et al. ............ 342/357.09 |

FOREIGN PATENT DOCUMENTS

| | | |
|---|---|---|
| EP | 1852711 | 11/2007 |
| EP | 1873546 | 1/2008 |
| JP | 2004529032 | 9/2004 |
| JP | 2007292763 | 11/2007 |
| JP | 20083092 | 1/2008 |
| JP | 2008191158 | 8/2008 |
| JP | 2008538234 | 10/2008 |
| TW | 200708053 | 2/2007 |
| TW | 200718964 | 5/2007 |
| WO | 02099454 A2 | 12/2002 |
| WO | 02099454 A3 | 12/2002 |
| WO | 2008055223 A2 | 5/2008 |
| WO | 2008066639 A2 | 6/2008 |

OTHER PUBLICATIONS

Wang Mengli et al., "Effective Age of GPS Almanac Data", May 31, 2007, p. 31-35, vol. 28, No. 3, Journal of Telemetry, Tracking, and Command.

[Wang], [Principles and Applications of GPS Navigation], [Aug. 31, 2003], [chapter 2.3.3], [Science Press], [Beijing].

* cited by examiner

METHOD AND APPARATUS FOR UPDATING TRANSFORMATION INFORMATION PARAMETERS USED IN GLOBAL NAVIGATION SATELLITE SYSTEM

CROSS REFERENCE TO RELATED APPLICATIONS

This application is a continuation-in-part of U.S. application Ser. No. 12/843,729, filed Jul. 26, 2010, which is a continuation of U.S. application Ser. No. 12/103,387, filed Apr. 15, 2008, which claims the benefit of U.S. Provisional Application No. 61/038,585, filed Mar. 25, 2008 and U.S. Provisional Application No. 60/990,229, filed Nov. 26, 2007.

BACKGROUND

The invention relates to a global navigation satellite system (GNSS) scheme, and more particularly to an update scheme of a set of transformation information parameters used for GNSS satellite trajectory extension data prediction.

For a GNSS receiver system, one of the most important tasks is to speed up Time To First Fix (TTFF), which is a measure of the time required by the GNSS receiver to acquire enough usable satellite signals and data and calculate a position point (called a fix). Speeding up the TTFF can be achieved by extending or predicting the satellite trajectory orbiting Earth, i.e. extending or predicting the orbit ephemeris. Details of one or more examples of a system for predicting satellite trajectory is described in U.S. Pat. No. 7,786,929, issued Aug. 31, 2010. For the prediction of the satellite trajectory, a set of transformation information parameters is required to achieve the coordinate transformation between a first coordinate system and a second coordinate system. The set of transformation information parameters including polar motion, earth rotation (sidereal-rotation), nutation, and precession is usually assumed to be known for the next several years. After a time period such as several years, the set of transformation information parameters will deviate from the presumed values. Once the set of transformation information parameters has expired and becomes incorrect, satellite trajectory deviations will be generated.

SUMMARY

It is therefore one of the objectives of the present invention to provide a method and an apparatus for updating a set of transformation information parameters used in a global navigation satellite system to solve the above-mentioned problems. The proposed method and apparatus can self-update the parameters, and generate better predictions of the satellite trajectory. In the meantime, the TTFF is reduced and the positioning accuracy and the user experience can be improved.

According to one embodiment of the present invention, a method for updating a set of transformation information parameters used in a global navigation satellite system is disclosed. The method comprises: obtaining at least one satellite navigation information for a satellite; and updating the set of transformation information parameters according to the obtained satellite navigation information.

According to the embodiment of the present invention, an apparatus for updating a set of transformation information parameters used in a global navigation satellite system is disclosed. The apparatus comprises a receiving circuit and a processing circuit. The receiving circuit is utilized for obtaining at least one satellite navigation information for a satellite. The processing circuit is coupled to the receiving circuit and utilized for updating the set of transformation information parameters according to the obtained satellite navigation information.

One of the advantages provided by the method and the apparatus is that the life time of the transformation information parameters is extended. Compared to the prior art schemes, the apparatus still can achieve precise prediction of the satellite trajectory orbiting Earth for a specific satellite even though the apparatus is a standalone device without any Internet connection ability/opportunity.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
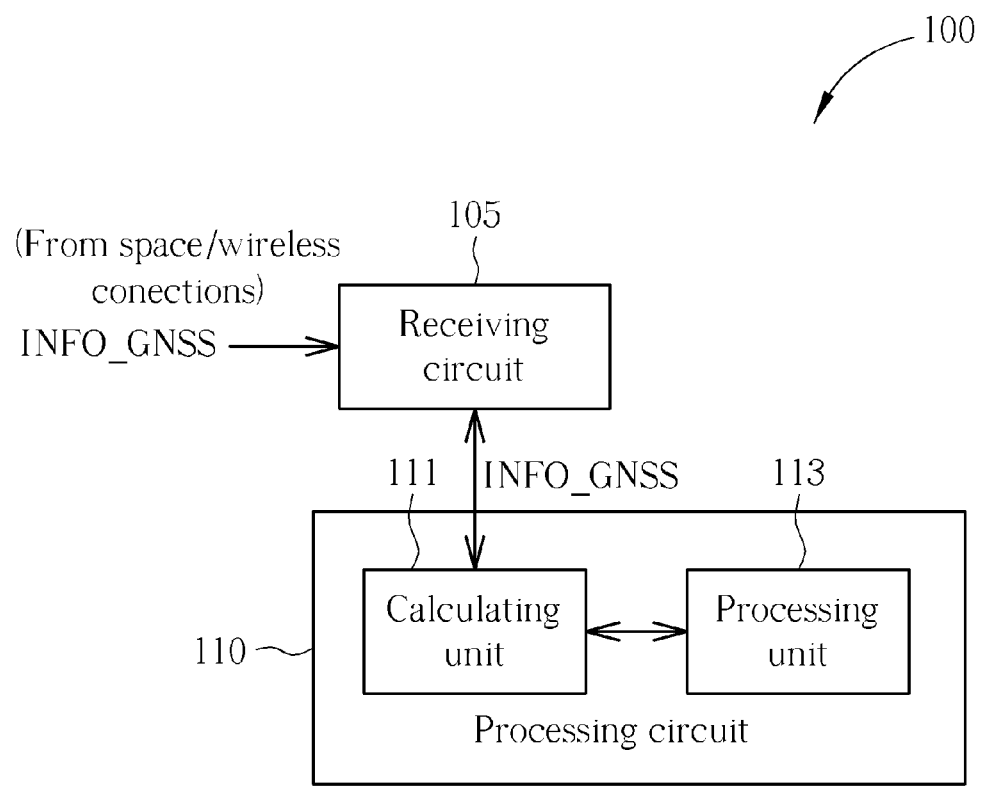
FIG. 1 is a diagram showing an apparatus used in a global navigation satellite system (GNSS) according to an embodiment of the present invention.

Please refer to FIG. 1, which illustrates a diagram showing an apparatus 100 used in a global navigation satellite system (GNSS) according to an embodiment of the present invention. The apparatus 100 is implemented by a GNSS receiver for receiving GNSS navigation information such as GNSS ephemeris messages and for calculating its location (latitude, longitude, and altitude) plus the current time. In this embodiment, the apparatus 100 is a GNSS receiver and arranged to predict the satellite trajectory for a particular satellite and to update a set of transformation information parameters since the coordinate transformation between a first coordinate system and a second coordinate system is required for the prediction of the satellite trajectory. In general, the set of transformation information parameters are defined in well-known standard matrix sequence of transformational rotations which are collectively known as Earth orientation model that includes a polar motion matrix, an earth rotation (sidereal-rotation) matrix, and a precession-nutation matrix. In order to achieve the precise prediction of the satellite trajectory, the values of these transformation information parameters may need to be updated before the values become expired. The apparatus 100 is therefore arranged to be able to self-update the set of transformation information parameters. In one embodiment, the self-update is achieved by utilizing mathematical modeling in the apparatus 100.

In practice, the apparatus 100 comprises a receiving circuit 105 and a processing circuit 110. The receiving circuit 105 is arranged to obtain at least one satellite navigation information INFO_GNSS for a particular satellite. For example, the receiving circuit 105 can be arranged to receive the satellite navigation information INFO_GNSS that is broadcasted from the particular satellite and received by the apparatus 100. The receiving circuit 105 can also be arranged to receive the satellite navigation information INFO_GNSS transmitted from an electronic device on Internet or other wireless connections such as GSM connections. In addition, the electronic device can also be a server or a work station that stores the broadcasted satellite navigation information INFO_GNSS and then sends the broadcasted satellite navigation information to the apparatus 100. The processing circuit 110 is utilized for updating the set of transformation information parameters according to the obtained satellite navigation information INFO_GNSS. In detail, the processing circuit 110 includes a calculating unit 111 and a processing unit 113. The calculating unit 111 is used for deriving a computed satellite data at a first coordinate system based on the obtained satellite navigation information INFO_GNSS. The satellite data may be the position, velocity or the acceleration of the particular satellite. The processing unit 113 is coupled to the calculating unit 111 and utilized for converting a satellite data from a second coordinate system into the first coordinate system using the set of transformation information parameters to generate a converted satellite data, for comparing the converted satellite data with the computed satellite data to generate a comparison result, and for updating the set of transformation information parameters according to the comparison result.

In practice, the first coordinate system could be, for example, the Earth Centered Earth Fixed (ECEF) coordinate system. The ECEF coordinate system is known as a conventional terrestrial coordinate system. The conventional terrestrial reference frame is the ITRF (International Terrestrial Reference Frame), and this is the frame used with most observations. The WGS-84 terrestrial frame is used primarily by the U.S. DoD and realized through GPS observations. In the same vein, each GNSS uses its own realization of the International Terrestrial Reference Frame (ITRF) as its coordinate system. For GLONASS it is PZ-90. Galileo will use the Galileo Terrestrial Reference System (GTRF). Japan's QZSS will use JGS, and Beidou uses China Geodetic System 2000 (CGS2000) which are coinciding with the International Terrestrial Reference Frame (ITRF) at a few centimeters. In the ECEF coordinate system, Earth orientation model is considered, and therefore coordinates of a point fixed on the surface of Earth do not change. The second coordinate system could be a celestial coordinate system such as the Earth Centered Inertial (ECI) coordinate system which defines the Newtonian-inertial space in which differential equations of satellite motion are valid. For satellites orbiting the Earth, the current inertial system (GCRF) or its predecessors, IAU-76/FK5 (J2000.0), FK4 (B1950.0) or any other systems of choice are conducted frequently. In a short word, Earth orientation model is considered in the first coordinate system of this embodiment but not considered in the second coordinate system.

Figure 2:
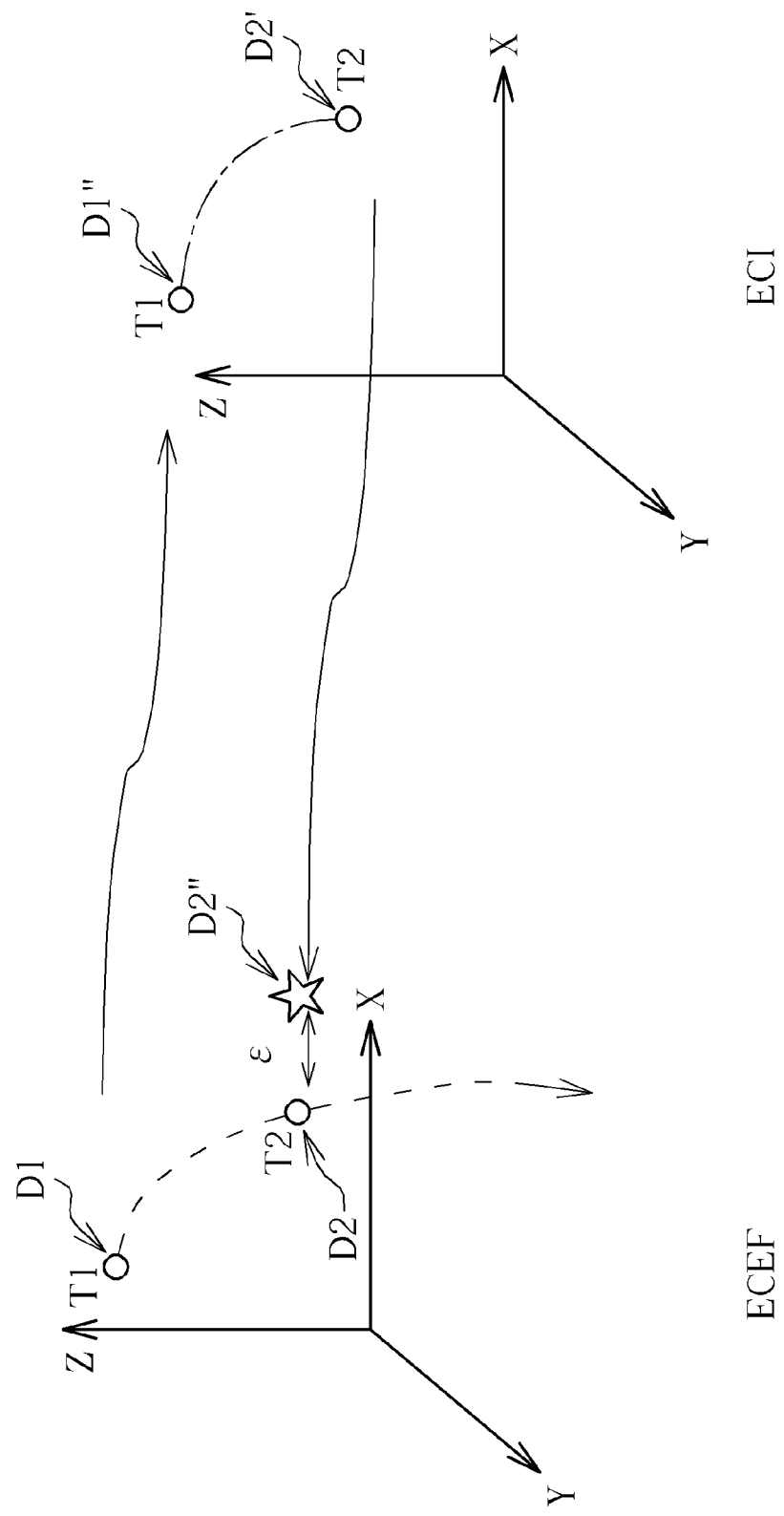
FIG. 2 is a diagram showing the coordinate transformation between the ECEF coordinate system and the ECI coordinate system.
Figure 3A:
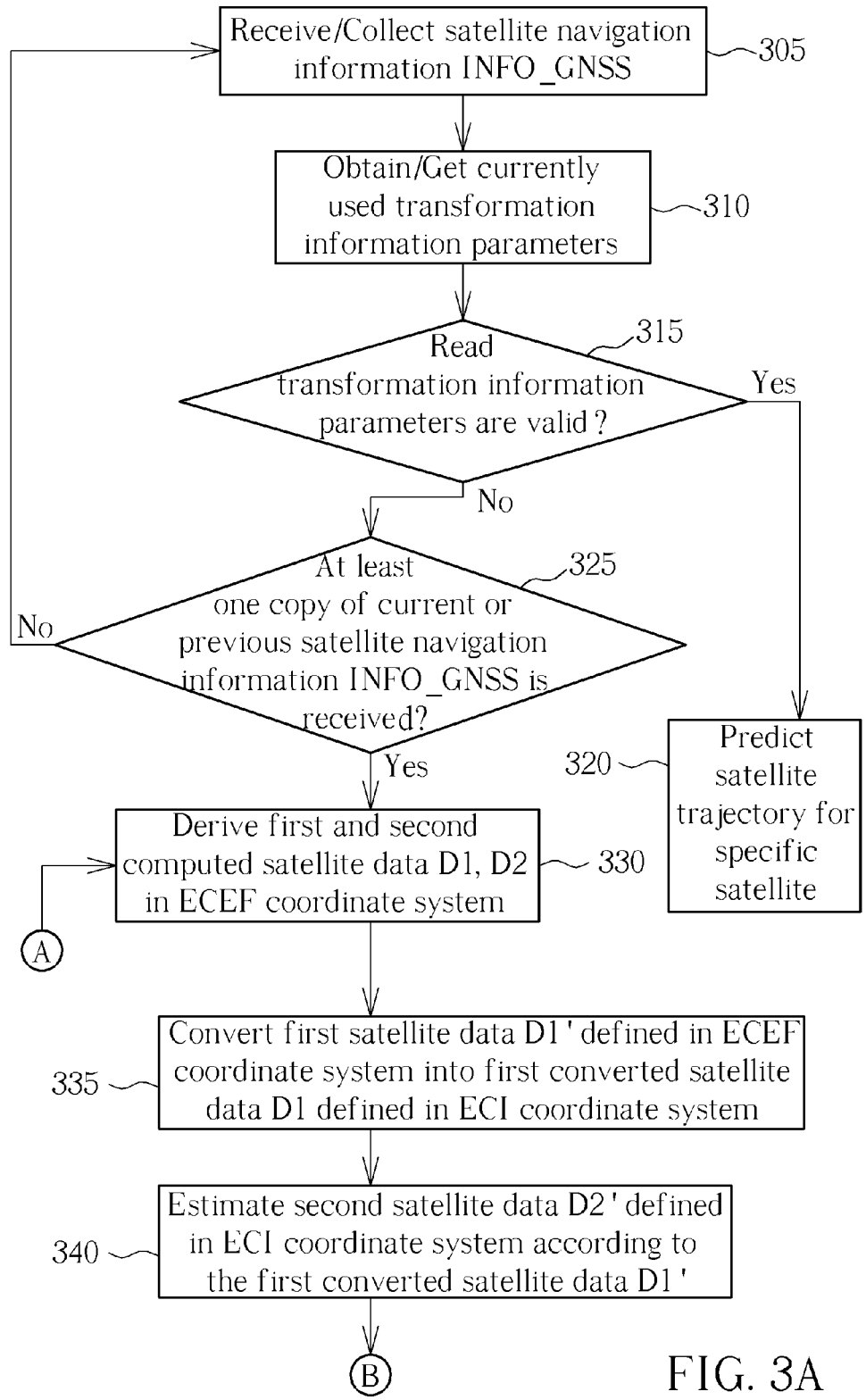
FIGS. 3A-3B show a flowchart of the operation of the apparatus as shown in FIG. 1 according to an embodiment of the present invention.
Figure 3B:
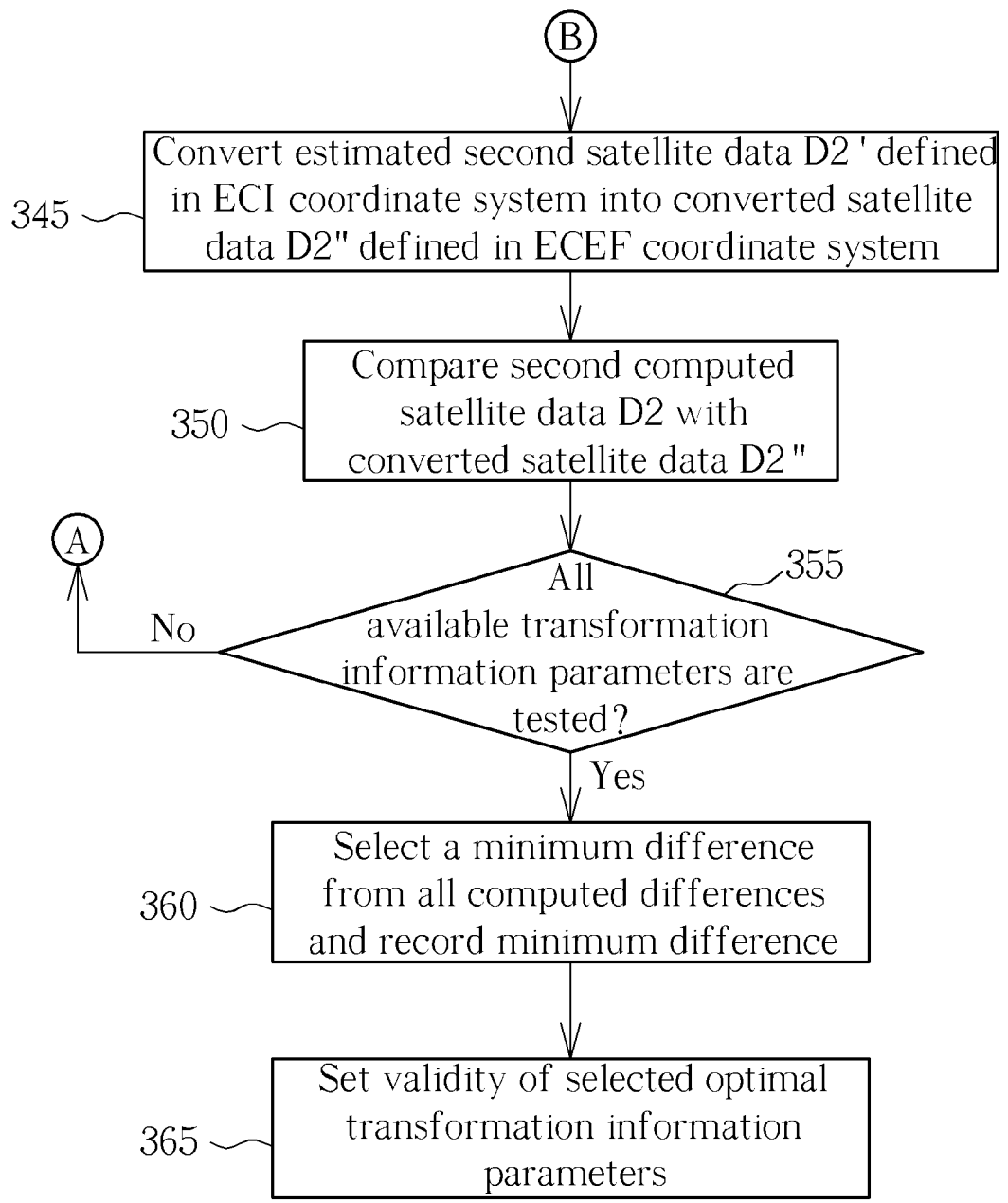

Please refer to FIG. 2 in conjunction with FIGS. 3A-3B. FIG. 2 is a diagram showing the coordinate transformation between the ECEF coordinate system and the ECI coordinate system. FIGS. 3A-3B show a flowchart of the operation of the apparatus 100 as shown in FIG. 1 according to an embodiment of the present invention. For the coordinate transformation, a set of precise transformation information parameters is required since the obtained copy of the satellite navigation information INFO_GNSS broadcasted from a specific satellite is defined in the ECEF coordinate system but the operation of predicting the satellite trajectory for the specific satellite is defined in the ECI coordinate system. In this embodiment, if a set of transformation information parameters that is currently used has expired or becomes inaccurate, the processing circuit 110 can generate a set of much more precise transformation information parameters based on multiple sets of available transformation information parameters according to the obtained satellite navigation information INFO_GNSS from the receiving circuit 105. In practice, the processing circuit 110 is arranged to select a set of precise transformation information parameters from the multiple sets of available transformation information parameters; however, this is not intended to be a limitation of the present invention. In other embodiments, the processing circuit 110 may be arranged to calculate a set of precise transformation information parameters based upon the multiple sets of available transformation information parameters.

In this embodiment, the receiving circuit 105 is arranged to receive/collect one copy of the satellite navigation information INFO_GNSS such as a GNSS ephemeris message whether this copy is directly or indirectly received from the specific satellite (Step 305), the processing unit 113 installed within the processing circuit 110 is arranged to obtain the set of currently used transformation information parameters (Step 310). The currently used transformation information parameters are stored or recorded in a database, and the processing unit 113 is arranged to read the transformation information parameters from this database. The processing unit 113 then checks the validity of the read transformation information parameters (Step 315). If the read transformation information parameters are valid, e.g. the read transformation information parameters have not expired or are not deviating from the normal range, the process proceeds to Step 320. In Step 320, the calculating unit 111 is arranged to calculate satellite data (e.g. the position and velocity) for a specific satellite according to the obtained GNSS ephemeris message INFO_GNSS where the satellite data is defined in the ECEF coordinate system as shown in FIG. 2, and the processing unit 113 is arranged to perform coordinate transformation, a prediction of the satellite trajectory for the specific satellite, and further operations, with reference to the read transformation information parameters.

In Step 315, when the read transformation information parameters are determined not valid, e.g. the read transformation information parameters have expired or are deviating from the normal range, the process proceeds to Step 325. The processing circuit 110 is arranged to check whether at least one current or previous GNSS ephemeris message INFO_GNSS is actually received. One of the purposes of this check is to determine whether to estimate a set of transformation information parameters, and another is to obtain the content of the current or previous GNSS ephemeris message INFO_GNSS if this message is received/collected. When at least one current or previous GNSS ephemeris message INFO_GNSS is received, the process proceeds to Step 330 and further steps are performed to estimate a set of transformation information parameters. When no current and previous GNSS ephemeris messages INFO_GNSS are received, the process proceeds to Step 305.

In Step 330, based on the current or previous GNSS ephemeris message (i.e. the obtained satellite navigation information INFO_GNSS), the calculating unit 111 of the processing circuit 110 derives first and second computed satellite data D1, D2 (both including position, velocity, etc.) respectively corresponding to two different time points T1 and T2 in the ECEF coordinate system (as shown in FIG. 2). In practice, the calculating unit 111 can compute the valid position or the velocity for the specific satellite at any time point within two to four hours defined in the ECEF coordinate system based on the GNSS ephemeris message INFO_GNSS. The first and second computed satellite data D1, D2 respectively corresponding to two different time points T1 and T2 in the ECEF coordinate system can be regarded as actual received satellite data. The processing unit 113 is then used to obtain first converted satellite data D1' by converting the first satellite data D1 from the ECEF coordinate system into the ECI coordinate system (Step 335). The currently used transformation information parameters that have expired are used in this coordinate transformation from the ECEF coordinate system to the ECI coordinate system. It should be noted that the currently used transformation information parameters can be read out again from the above-mentioned database by the processing circuit 110 if the read transformation information parameters in Step 310 are not stored or buffered.

The processing unit 113 then estimates a satellite data D2' corresponding to the second time point T2 defined in the ECI coordinate system according to the first converted satellite data D1', i.e. to predict the satellite trajectory of the specific satellite from the time point T1 to the time point T2 (Step 340). The prediction of the satellite trajectory may involve integration mathematics; however, this is not intended to be a limitation of the present invention. In Step 345, the processing unit 113 obtains a converted satellite data D2" by converting the estimated satellite data D2' from the ECI coordinate system into the ECEF coordinate system. Ideally, since both the second computed satellite data D2 of Step 330 and the converted satellite data D2" of Step 345 correspond to the same time point (i.e. T2) and are also defined in the ECEF coordinate system, the second computed satellite data D2 (position or velocity) of Step 330 should equal the converted satellite data D2" (position or velocity) of Step 345. Some errors, however, may be introduced and the converted satellite data D2" of Step 345 is not equal to the computed second satellite data D2 of Step 330.

The errors may include: coordinate transformation errors due to incorrect transformation information parameters that have expired and calculation errors due to the prediction of the satellite trajectory. In this embodiment, the calculation errors are assumed to be fixed and can be ignored. Thus, the difference $\epsilon$ between the second computed satellite data D2 of Step 330 and the converted satellite data D2" of Step 345 indicates the quality of the transformation information parameters used for the coordinate transformation calculation. When the difference $\epsilon$ is large, this implies that the transformation information parameters are worse. When the difference $\epsilon$ is small, this implies that the transformation information parameters are better. The processing unit 113 is arranged to compare the second computed satellite data D2 of Step 330 with the converted satellite data D2" of Step 345 (Step 350). More particularly, the processing unit 113 is utilized for computing the difference $\epsilon$ between the second computed satellite data D2 of Step 330 and the converted satellite data D2" of Step 345.

The process then proceeds to Step 355. In Step 355, the processing unit 113 determines whether all available sets of transformation information parameters are tested. For example, if only one computed difference is recorded, this indicates that the processing unit 113 tests only one set of transformation information parameters. In this embodiment, it is assumed that all of the available sets of transformation information parameters are tested. That is, if ten sets of transformation information parameters exist, in Step 355, the processing unit 113 is arranged to check whether ten computed differences are generated. If not all the sets of transformation information parameters are tested, the process proceeds to Step 330; Steps 330-350 are performed again. Otherwise, if each set of transformation information parameters is tested, the process proceeds to Step 360. In Step 360, the processing unit 113 is arranged to select a minimum difference from all the computed differences. The set of transformation information parameters corresponding to this minimum difference is selected for a set of optimal transformation information parameters. The selected optimal transformation information parameters are used by the processing unit 113 to update the currently used transformation information parameters that have expired. It should be noted that in a further modification of this implementation the processing unit 113 can obtain or get the selected optimal transformation information parameters without testing all of the available transformation information parameters. For example, the processing unit 113 can use a specific algorithm to choose several sets of representative transformation information parameters from all sets of parameters and only tests the representative transformation information parameters to obtain the optimal transformation information parameters. The specific algorithm can include any searching algorithm or the min-max algorithm, etc. This is not meant to be a limitation of the present invention.

After Step 360, the process proceeds to Step 365. The validity of the selected optimal transformation information parameters is set (Step 365). Accordingly, the processing unit 113 uses the selected optimal parameters as a set of transformation information parameters that will be used during several coming days/months/years to extend the life time of the transformation information parameters. Thus, by minimizing or reducing the difference $\epsilon$ between the computed second satellite data D2 of Step 330 and the converted satellite data D2" of Step 345, the apparatus 100 can obtain a set of optimal and precise transformation information parameters, and the prediction of the satellite trajectory becomes more precise.

Figure 4A:
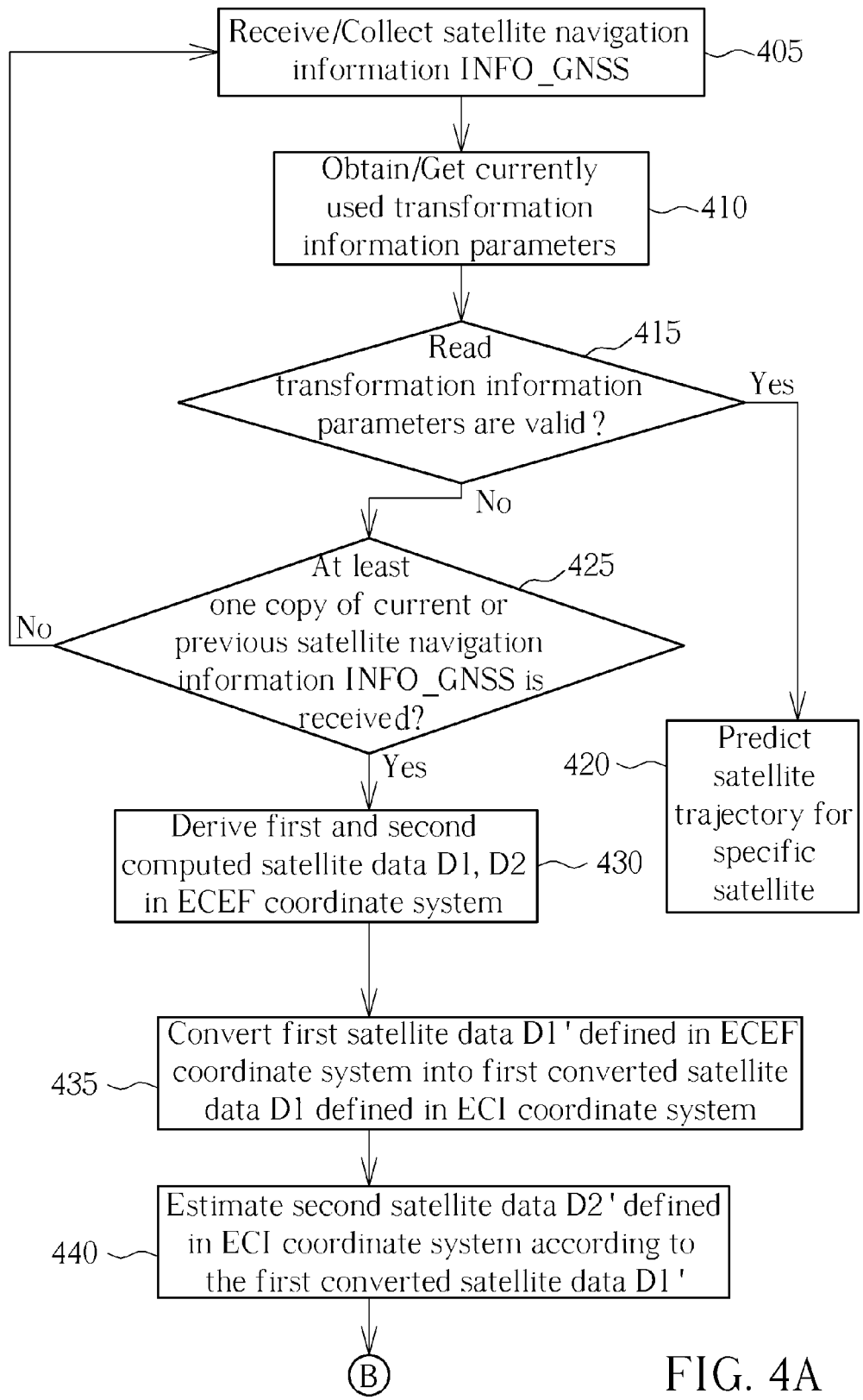
FIGS. 4A-4B show a flowchart of the operation of the apparatus as shown in FIG. 1 according to another embodiment of the present invention.
Figure 4B:
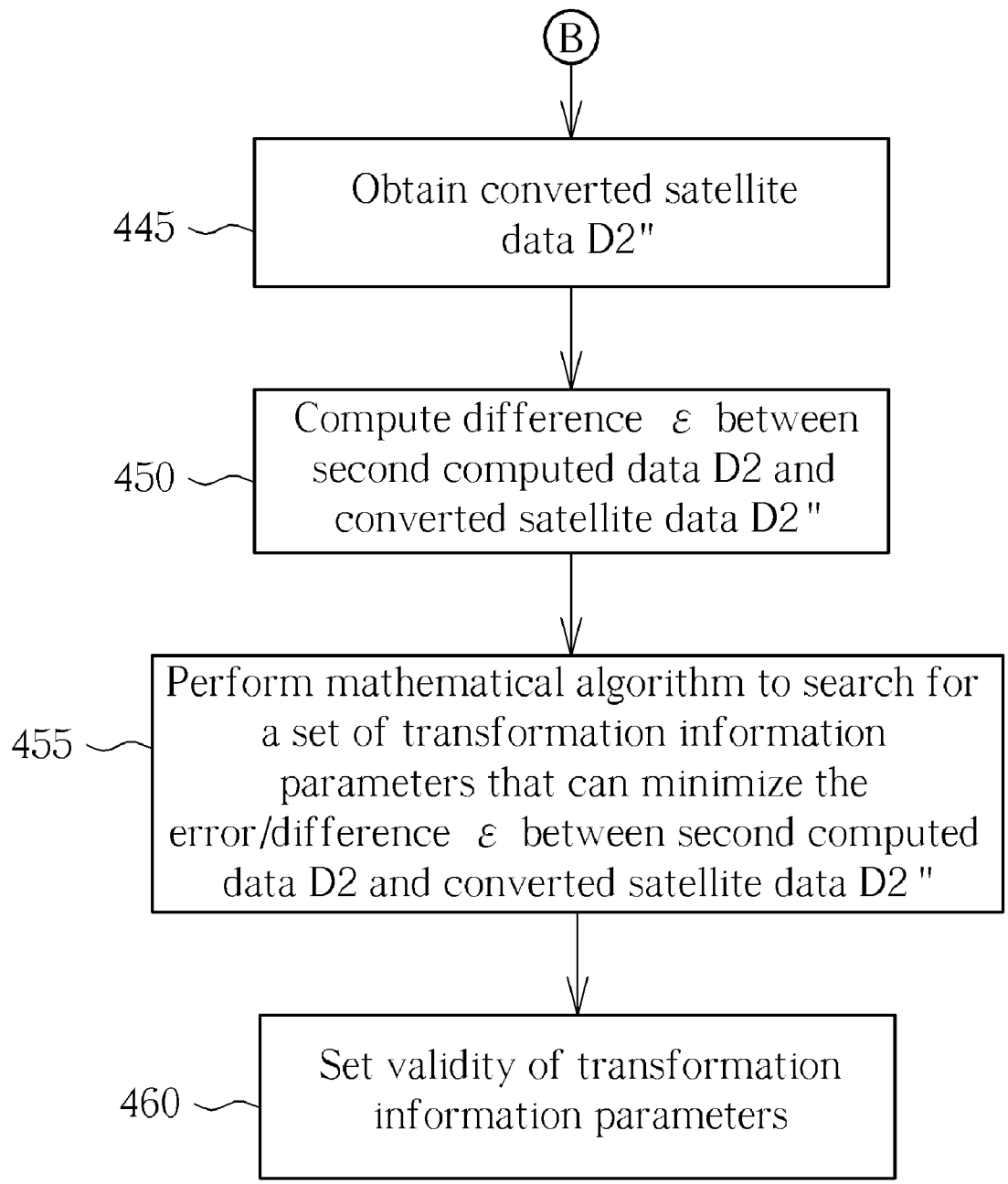

In another embodiment shown as FIG. 4A-4B, after obtaining the converted satellite data D2" (Step 445), the processing unit 113 computes the difference $\epsilon$ between the second computed data D2 and the converted satellite data D2" (Step 450). Then, the processing unit 113 performs a mathematical algorithm, such as but not limited to least mean square (LMS) algorithm, to search for a set of transformation information parameters that can reduce or minimize the error/difference $\epsilon$ between the second computed data D2 and the converted satellite data D2" (Step 455). After the optimized transformation information parameters are obtained, the processing unit 113 stores them into the database and set the validity in step 460.

Please be noted that the parameters in four transformation matrices (polar motion, sidereal-rotation, nutation, and precession) can be update/calibrate at the same time or separately. The failure in validity check may result from life-time expiration or other reasons, such as inaccurate position/fix of the GNSS receiver. In the above embodiments, the functions and operations of the receiving circuit 105 and processing circuit 110 are installed within a GNSS receiver such as a GNSS chip or a mobile communication chip with navigation capability. However, a partial calculation load of the processing circuit 110 can be shared with a central processing unit of a mobile device such as a mobile phone if this GNSS receiver is installed within the mobile phone. This can decrease the loading of the apparatus 100 and improve the efficiency of the apparatus 100. In addition, the partial calculation load of the processing circuit 110 can be also shared with an external working station or an external server via any wireless communication channels. This also obeys the spirit of the present invention.

Further, in other embodiments, the time points T1 and T2 respectively correspond to two set of satellite navigation information INFO_GNSS1, INFO_GNSS2 individually belonging to different time ranges. For example, the receiving circuit 105 may receive or collect two sets of satellite navigation information wherein one is the current satellite navigation information INFO_GNSS2 and the other is the former satellite navigation information INFO_GNSS1. The calculating unit 111 of the processing circuit 110 is arranged to calculate the first computed satellite data D1 corresponding to the time point T1 according to the former satellite navigation information INFO_GNSS1 and to calculate the second computed satellite data D2 corresponding to the time point T2 according to the current satellite navigation information INFO_GNSS2. In addition, in another embodiment, the apparatus 100 can be designed to be externally coupled to a GNSS receiver chip. For instance, the apparatus 100 can be a circuit chip included within a mobile phone but externally coupled to the GNSS receiver chip. Under this condition, the processing circuit 110 is arranged to transmit a set of updated transformation information parameters generated from updating the set of transformation information parameters to the GNSS receiver. These modifications also fall within the scope of the present invention.

Those skilled in the art will readily observe that numerous modifications and alterations of the device and method may be made while retaining the teachings of the invention.

What is claimed is:

1. A method for updating a set of transformation information parameters used in a global navigation satellite system (GNSS), comprising:
   obtaining at least one satellite navigation information for a satellite; and
   updating the set of transformation information parameters according to the obtained satellite navigation information;
   wherein the set of transformation information parameters is used to calculate coordinate transformation between a first coordinate system and a second coordinate system, and the step of updating the set of transformation information parameters according to the obtained satellite navigation information comprises:
      deriving a computed satellite data corresponding to a time point at the first coordinate system according to the obtained satellite navigation information;
      generating a converted satellite data by converting a satellite data corresponding to the time point at the second coordinate system into the converted satellite data at the first coordinate system using the set of transformation information parameters; and
      comparing the converted satellite data with the computed satellite data to update the set of transformation information parameters.

2. The method of claim 1, wherein the step of comparing the converted satellite data with the computed satellite data to update the set of transformation information parameters comprises:
   calibrating the set of transformation information parameters by reducing a difference between the converted satellite data and the computed satellite data.

3. The method of claim 1, wherein
   the step of generating the converted satellite data comprises:
      computing a first computed satellite data corresponding to a first time point at the first coordinate system according to the obtained satellite navigation information;
      obtaining a first converted satellite data by converting the first computed satellite data into the first converted satellite data corresponding to the first time point at the second coordinate system using the set of transformation information parameters;
      estimating the satellite data at the second coordinate system according to the first converted satellite data; and
      obtaining the converted satellite data by converting the satellite data into the converted satellite data at the first coordinate system using the set of transformation information parameters.

4. The method of claim 1, wherein the computed satellite data comprises a position or a velocity of the satellite at the time point, and the converted satellite data comprises a position or a velocity of the satellite at the time point transformed from the second coordinate system to the first coordinate system.

5. The method of claim 1, further comprising:
   checking a validity of the set of transformation information parameters;
   and the step of updating the set of transformation information parameters comprises:
      when the set of transformation information parameters is not valid, updating the set of transformation information parameters according to the obtained satellite navigation information.

6. The method of claim 1, wherein the step of deriving the computed satellite data is further performed according to a first set of satellite navigation information, and the step of generating the converted satellite data is further performed according to a second set of satellite navigation information.

7. The method of claim 1, wherein Earth orientation model is considered in the first coordinate system while the Earth orientation model is not considered in the second coordinate system.

8. An apparatus for updating a set of transformation information parameters used in a global navigation satellite system, comprising:
   a receiving circuit, for obtaining at least one satellite navigation information for a satellite; and
   a processing circuit, coupled to the receiving circuit, for updating the set of transformation information parameters according to the obtained satellite navigation information;
   wherein the set of transformation information parameters is used to calculate coordinate transformation between a first coordinate system and a second coordinate system, and the processing circuit comprises:
      a calculating unit, for deriving a computed satellite data corresponding to a time point at the first coordinate system according to the obtained satellite navigation information; and a processing unit, coupled to the calculating unit, for generating a converted satellite data by converting a satellite data corresponding to the time point at the second coordinate system into the converted satellite data at the first coordinate system using the set of transformation information parameters, and for comparing the converted satellite data with the computed satellite data to update the set of transformation information parameters.

9. The apparatus of claim 8, wherein the processing unit is arranged to calibrate the set of transformation information parameters by reducing a difference between the converted satellite data and the computed satellite data.

10. The apparatus of claim 8, wherein the processing unit is used for computing a first computed satellite data corresponding to a first time point in the first coordinate system according to the obtained satellite navigation information, obtaining a first converted satellite data by converting the first computed satellite data into the first converted satellite data corresponding to the first time point in the second coordinate system using the set of transformation information parameters, estimating the satellite data at the second coordinate system according to the first converted satellite data, and obtaining the converted satellite data by converting the satellite data into the converted satellite data at the first coordinate system using the set of transformation information parameters.

11. The apparatus of claim 8, wherein the computed satellite data comprises a position or a velocity of the satellite at the time point, and the converted satellite data comprises a position or a velocity of the satellite at the time point transformed from the second coordinate system to the first coordinate system.

12. The apparatus of claim 8, wherein the processing circuit is further arranged to check a validity of the set of transformation information parameters, and the processing circuit updates the set of transformation information parameters according to the obtained satellite navigation information when the set of transformation information parameters is not valid.

13. The apparatus of claim 8, wherein the receiving circuit is arranged to obtain a plurality of sets of different satellite navigation information for the satellite; and the calculating unit further derives the computed satellite data according to a first set of satellite navigation information included in the sets of different satellite navigation information, and the processing unit further generates the converted satellite data according to a second set of satellite navigation information included in the sets of different satellite navigation information.

14. The apparatus of claim 8, wherein Earth orientation model is considered in the first coordinate system while the Earth orientation model is not considered in the second coordinate system.

15. The apparatus of claim 8 is installed within a global navigation satellite system receiver.

16. The apparatus of claim 8 being externally coupled to a global navigation satellite system receiver, and the processing circuit is further arranged to transmit a set of updated transformation information parameters generated from updating the set of transformation information parameters to the global navigation satellite system receiver.

* * * * *